United States Patent
Cantin et al.

(10) Patent No.: US 9,201,654 B2
(45) Date of Patent: Dec. 1, 2015

(54) PROCESSOR AND DATA PROCESSING METHOD INCORPORATING AN INSTRUCTION PIPELINE WITH CONDITIONAL BRANCH DIRECTION PREDICTION FOR FAST ACCESS TO BRANCH TARGET INSTRUCTIONS

(75) Inventors: Jason F. Cantin, Round Rock, TX (US); Jack R. Smith, South Burlington, VT (US); Arnold S. Tran, South Burlington, VT (US); Kenichi Tsuchiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 13/171,027

(22) Filed: Jun. 28, 2011

(65) Prior Publication Data

US 2013/0007425 A1    Jan. 3, 2013

(51) Int. Cl.
*G06F 9/38* (2006.01)

(52) U.S. Cl.
CPC ............ *G06F 9/3806* (2013.01); *G06F 9/3848* (2013.01)

(58) Field of Classification Search
CPC .................................................... G06F 9/3848
See application file for complete search history.

(56) References Cited

U.S. PATENT DOCUMENTS

| | | | |
|---|---|---|---|
| 5,353,421 A | 10/1994 | Emma et al. | |
| 6,694,425 B1 | 2/2004 | Eickemeyer | |
| 7,165,169 B2 | 1/2007 | Henry et al. | |
| 7,631,172 B2 | 12/2009 | Henry et al. | |
| 7,707,396 B2 | 4/2010 | Bradford et al. | |
| 7,747,845 B2 * | 6/2010 | Prasky et al. | 712/239 |
| 2002/0194464 A1 * | 12/2002 | Henry et al. | 712/239 |
| 2008/0005543 A1 * | 1/2008 | Rychlik | 712/239 |
| 2008/0235500 A1 | 9/2008 | Davis et al. | |
| 2009/0049286 A1 | 2/2009 | Levitan et al. | |
| 2009/0198962 A1 | 8/2009 | Levitan et al. | |
| 2009/0198981 A1 | 8/2009 | Levitan et al. | |
| 2009/0198982 A1 | 8/2009 | Levitan et al. | |
| 2009/0198985 A1 | 8/2009 | Levenstein et al. | |

OTHER PUBLICATIONS

IBM, "PowerPC 476FP Embedded Processor Core and PowerPC 470S Synthesizable Core," User's Manual, Version 1.5, Preliminary Apr. 13, 2011, pp. 286-298.

* cited by examiner

*Primary Examiner* — Andrew Caldwell
*Assistant Examiner* — John Lindlof
(74) *Attorney, Agent, or Firm* — Gibb & Riley, LLC; Michael J. LeStrange, Esq.

(57) ABSTRACT

Disclosed are a processor and a processing method incorporating an instruction pipeline with direction prediction (i.e., taken or not taken) for conditional branch instructions. In the embodiments, reading of a branch instruction history table (BHT) and a branch instruction target address cache (BTAC) for branch direction prediction occurs in parallel with the current instruction fetch in order to minimize delay in the next instruction fetch. Additionally, direction prediction is performed in the very next clock cycle based either on an initial direction prediction for the specific instruction, as stored in the BHT, or, if applicable, on a prior entry for the specific instruction in the BTAC. An override bit associated with each entry in the BTAC is the determining factor for whether or the BTAC or BHT is controlling. Override bits in the BTAC can be pre-established based on the branch instruction type in order to ensure prediction accuracy.

25 Claims, 8 Drawing Sheets

| PIPELINE STAGE | T0 | T1 | T2 |
|---|---|---|---|
| INSTRUCTION FETCH | The I-Cache Receives The Address A And Reads The Instruction | | |
| INSTRUCTION STEERING | The BHT and BTAC Each Receive The Address A And Look For The Corresponding Entries | Based On Signals Received From The BHT And BTAC, The Direction Predictor Makes A Taken/Not Taken Prediction. If The Target Address Is Immediately Available, It Is Forward To The Address Register | If The Target Address Is Not Immediately Available, It Is Calculated And Forwarded To The Address Register |

Figure 4

| BTAC Lookup Result ||  Final Branch Prediction (Output of Direction Predictor 230) |
|---|---|---|
| Direction Predicted by BTAC (Signal 222) | Override Bit (Signal 223) | |
| 0 | 0 | Determined By BHT signal 211 |
| 1 | 0 | Taken |
| 0 | 1 | Determined By BHT signal 211 |
| 1 | 1 | Determined By BHT signal 211 |

PROCESSOR AND DATA PROCESSING METHOD INCORPORATING AN INSTRUCTION PIPELINE WITH CONDITIONAL BRANCH DIRECTION PREDICTION FOR FAST ACCESS TO BRANCH TARGET INSTRUCTIONS

BACKGROUND

1. Field of the Invention

The embodiments herein relate to computer processors, and more specifically, to a computer processor and data processing method incorporating an instruction pipeline with conditional branch direction prediction for fast access to branch target instructions.

2. Description of the Related Art

As mentioned above, computer processors often incorporate an instruction pipeline to increase instruction throughput by dividing the processor into separate stages. In an exemplary five-stage pipelined processor, the stages may include an instruction fetch stage (also referred to herein as instruction cache read (ICRD) stage), an instruction decode stage, an instruction execution stage, a memory access stage and a write-back stage. During the instruction fetch stage, an instruction comprising a given number of bits (e.g., 32 bits) is fetched from a specific address of an instruction cache (I-cache). During the instruction decode stage, the instruction bits are passed through combinational logic to produce control signals. During the instruction execution stage, the control signals are executed. During the memory access stage, data, if any, required for execution of the instruction is read (e.g., from a data cache (D-cache)). During the write-back stage, the results of executing the instruction are written into a register file. Ideally, in such a five-stage pipeline processor, each instruction enters the pipeline and spends one clock cycle at each stage, so that a single instruction takes five cycles to pass through the pipeline. Additionally, when one instruction is fetched and moved to the decode stage, the next instruction in the sequence can be fetched and so on. However, branch instructions and, particularly, conditional branch instructions introduce a temporary uncertainty into the pipeline which can result in one or more stages remaining idle in a given cycle and, thereby causing delay.

Specifically, when a sequence of instructions being processed through a pipeline includes a conditional branch instruction, the fetch address (i.e., the address in the I-cache) of the instruction following the conditional branch instruction may not be known until after the conditional branch instruction is actually decoded and executed. Waiting to fetch the next instruction in the sequence until after decoding and execution of the conditional branch instruction can result in a large stall (i.e., a stall of multiple cycles) and, thereby a missed opportunity to fetch other instructions in the sequence and avoid delay.

Consequently, modern computer processors often incorporate an instruction steering stage, wherein a direction predictor is used to determine whether an instruction is a conditional branch instruction and, if so, whether the conditional branch instruction will be not taken such that the next instruction in the sequence will be found in the next sequential address in the I-cache or whether that conditional branch instruction will be taken such that the next instruction in the sequence will be found at some other address in the I-cache. Furthermore, the instruction steering stage will also often incorporate a branch instruction target address cache (BTAC) to further predict the target address of the conditional branch instruction when that conditional branch instruction is predicted taken. The accuracy and timing of instruction steering, including branch instruction direction prediction and, if applicable, target address prediction, are extremely important to avoid performance penalties as a result of a delayed and/or an incorrect instruction fetch. While various instruction steering techniques are known, there is still need for improvement.

SUMMARY

In view of the foregoing, disclosed herein are embodiments of a computer processor and a data processing method incorporating an instruction pipeline with direction prediction (i.e., taken or not taken) for conditional branch instructions. In the embodiments, reading of a branch instruction history table (BHT) and a branch instruction target address cache (BTAC) for branch direction prediction occurs in parallel with (i.e., in the same clock cycle as) the current instruction fetch (i.e., the current instruction I-cache read) in order to minimize delay in the next instruction fetch (i.e., to provide fast access to branch target instructions). Additionally, direction prediction is performed in the very next clock cycle based either on an initial direction prediction for the specific instruction, as stored in a branch instruction history table (BHT) and indexed by the instruction fetch address, or, if applicable, on a prior entry for the specific instruction in a branch instruction target address cache (BTAC), also as indexed by the instruction fetch address. An override bit associated with each entry (i.e., each hit) in the BTAC is the determining factor for whether or not the BTAC or BHT is controlling. Override bits in the BTAC can be pre-established (e.g., by a system architect or designer) based, for example, on the branch instruction type of the conditional branch instruction in order to ensure prediction accuracy.

More particularly, disclosed herein are embodiments of a pipelined processor. The pipeline processor can comprise a branch instruction history table (BHT), a branch instruction target address cache (BTAC), an instruction fetch address register and a direction predictor. The BHT can store initial direction predictions for conditional branch instructions stored in an instruction cache (I-cache), where each direction prediction is either taken or not taken. The BTAC can store, for any conditional branch instructions previously predicted as taken, target addresses and override bits. The override bits can, for example, be pre-established based on the branch instruction type of the conditional branch instructions. The instruction fetch address register can essentially simultaneously (i.e., in the same clock cycle) submit a specific address for a specific instruction in the instruction cache to the instruction cache (I-cache), the branch instruction history table (BHT) and the branch instruction target address cache (BTAC). In response to the specific address, the branch instruction history table (BHT) can output, to the direction predictor, a first signal indicative of an initial direction prediction stored in the branch instruction history table (BHT) for the specific instruction. Additionally, in response to the specific address, the branch instruction target address cache (BTAC) can output to the direction predictor both a second signal indicative of whether the specific instruction is entered in the branch instruction target address cache (BTAC) and a third signal indicative of an override bit associated with the specific instruction.

The direction predictor, which is in communication with the branch instruction history table (BHT) and the branch instruction target address cache (BTAC), can process the three signals in order to determine a final direction prediction for the specific instruction. Specifically, depending upon whether the specific instruction is entered in the branch instruction target address cache (BTAC) (as indicated by the second signal) and, if so, what override bit is associated with that specific instruction (as indicated by the third signal), either the first signal from the BHT or the second signal from the BTAC will control the direction prediction. In the case where BTAC controls, the target address for the next instruction will be immediately available (i.e., will not need to be calculated). Thus, in the processor embodiments disclosed herein, reading of the BHT and BTAC for branch direction prediction occurs in parallel with (i.e., in the same clock cycle as) the current instruction fetch (i.e., the current instruction I-cache read) in order to minimize delay in the next instruction fetch. Furthermore, since other factors (e.g., the branch instruction type, how it is used by a compiler, etc.) are considered by means of the override bits, the accuracy of direction prediction is improved.

Also disclosed herein are embodiments of a data processing method. The method embodiments can comprise storing, in a branch instruction history table (BHT), initial direction predictions for conditional branch instructions stored in an instruction cache (I-cache), where each direction prediction is either taken or not taken. The method embodiments can further comprise storing, in a branch instruction target address cache, target addresses and override bits for any conditional branch instructions previously predicted as taken. The override bits can, for example, be pre-established based on the branch instruction type of the conditional branch instructions. The method embodiments can further comprise essentially simultaneously (i.e., in the same clock cycle) submitting, by an instruction fetch address register to the instruction cache (I-cache), the branch instruction history table (BHT) and the branch instruction target address cache (BTAC), a specific address for a specific instruction in the instruction cache. In response to the specific address, a first signal indicative of an initial direction prediction stored in the branch instruction history table (BHT) for the specific instruction can be output (e.g., by the branch instruction history table (BHT) to a direction predictor). Additionally, in response to the specific address, both a second signal indicative of whether the specific instruction is entered in the branch instruction target address cache (BTAC) and a third signal indicative of an override bit associated with the specific instruction can be output (e.g., by the branch instruction target address cache (BTAC) to the direction predictor).

Next, the three signals (i.e., the first signal, the second signal and the third signal) can be processed (e.g., by the direction predictor) in order to determine a final direction prediction for the specific instruction. Specifically, depending upon whether the specific instruction is entered in the branch instruction target address cache (BTAC) (as indicated by the second signal) and, if so, what override bit is associated with that specific instruction (as indicated by the third signal), either the first signal from the BHT or the second signal from the BTAC will control the direction prediction. In the case where BTAC controls, the target address for the next instruction will be immediately available (i.e., will not need to be calculated). Thus, in the data processing method embodiments disclosed herein, reading of the BHT and BTAC for branch direction prediction occurs in parallel with (i.e., in the same clock cycle as) the current instruction fetch (i.e., the current instruction I-cache read) in order to minimize delay in the next instruction fetch. Furthermore, since other factors (e.g., the branch instruction type, how it is used by a compiler, etc.) are considered by means of the override bits, the accuracy of direction prediction is improved.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

The embodiments herein and the various features and advantageous details thereof are explained more fully with reference to the non-limiting embodiments that are illustrated in the accompanying drawings and detailed in the following description.

As mentioned above, computer processors often incorporate an instruction pipeline to increase instruction throughput by dividing the processor into separate stages. In an exemplary five-stage pipelined processor, the stages may include an instruction fetch stage (also referred to herein as instruction cache read (ICRD) stage), an instruction decode stage, an instruction execution stage, a memory access stage and a write-back stage. During the instruction fetch stage, an instruction comprising a given number of bits (e.g., 32 bits) is fetched from a specific address of an instruction cache (I-cache). During the instruction decode stage, the instruction bits are passed through combinational logic to produce control signals. During the instruction execution stage (also referred to herein as the instruction execute stage), the control signals are executed. During the memory access stage, data, if any, required for execution of the instruction is read (e.g., from a data cache (D-cache)). During the write-back stage, the results of executing the instruction are written into a register file. Ideally, in such a five-stage pipeline processor, each instruction enters the pipeline and spends one clock cycle at each stage, so that a single instruction takes five cycles to pass through the pipeline. Additionally, when one instruction is fetched and moved to the decode stage, the next instruction in the sequence can be fetched and so on. However, branch instructions and, particularly, conditional branch instructions introduce a temporary uncertainty into the pipeline which can result in one or more stages remaining idle in a given cycle and, thereby causing delay.

Specifically, when a sequence of instructions being processed through a pipeline includes a conditional branch instruction, the fetch address (i.e., the address in the I-cache) of the instruction following the conditional branch instruction may not be known until after the conditional branch instruction is actually decoded and executed. Waiting to fetch the next instruction in the sequence until after decoding and execution of the conditional branch instruction can result in a large stall (i.e., a stall of multiple cycles) and, thereby a missed opportunity to fetch other instructions in the sequence and avoid delay.

Consequently, modern computer processors often incorporate an instruction steering stage, wherein a direction predictor is used to determine whether an instruction is a conditional branch instruction and, if so, whether the conditional branch instruction will be not taken such that the next instruction in the sequence will be found in the next sequential address in the I-cache or whether that conditional branch instruction will be taken such that the next instruction in the sequence will be found at some other address in the I-cache. Furthermore, the instruction steering stage will also often incorporate a branch instruction target address cache (BTAC) to further predict the target address of the conditional branch instruction when that conditional branch instruction is predicted taken. The accuracy and timing of instruction steering, including branch instruction direction prediction and, if applicable, target address prediction, are extremely important to avoid performance penalties as a result of a delayed and/or an incorrect instruction fetch.

While various instruction steering techniques are known, there is still need for improvement. For example, modern computer processors typically base direction prediction on dynamic predictions maintained in a branch history table (BHT). The branch history table (BHT) is generally implemented as a counter that indicates, for each instruction as indexed by I-cache address, the history of actual branches executed. However, since other factors (e.g., the branch instruction type, how it is used by a compiler, etc.) are not considered by the BHT, the direction prediction may be inaccurate, possibly resulting in a stall. Furthermore, modern processors typically do not perform branch direction prediction and target address prediction until after the instruction cache (I-cache) is fetched and after the instructions are decoded, again possibly resulting in a stall.

In view of the foregoing, disclosed herein are embodiments of a computer processor and a data processing method incorporating an instruction pipeline with direction prediction (i.e., taken or not taken) for conditional branch instructions. In the embodiments, reading of a branch instruction history table (BHT) and a branch instruction target address cache (BTAC) for branch direction prediction occurs in parallel with (i.e., in the same clock cycle as) the current instruction fetch (i.e., the current instruction I-cache read) in order to minimize delay in the next instruction fetch (i.e., in order to provide fast access to branch target instructions). Additionally, direction prediction is performed in the very next clock cycle based either on an initial direction prediction for the specific instruction, as stored in a branch instruction history table (BHT) and indexed by the instruction fetch address, or, if applicable, on a prior entry for the specific instruction in a branch instruction target address cache (BTAC), also as indexed by the instruction fetch address. An override bit associated with each entry (i.e., each hit) in the BTAC is the determining factor for whether or not the BTAC or BHT is controlling. Override bits in the BTAC can be pre-established (e.g., by a system architect or designer) based, for example, on the branch instruction type of the conditional branch instruction in order to ensure prediction accuracy.

Figure 1:
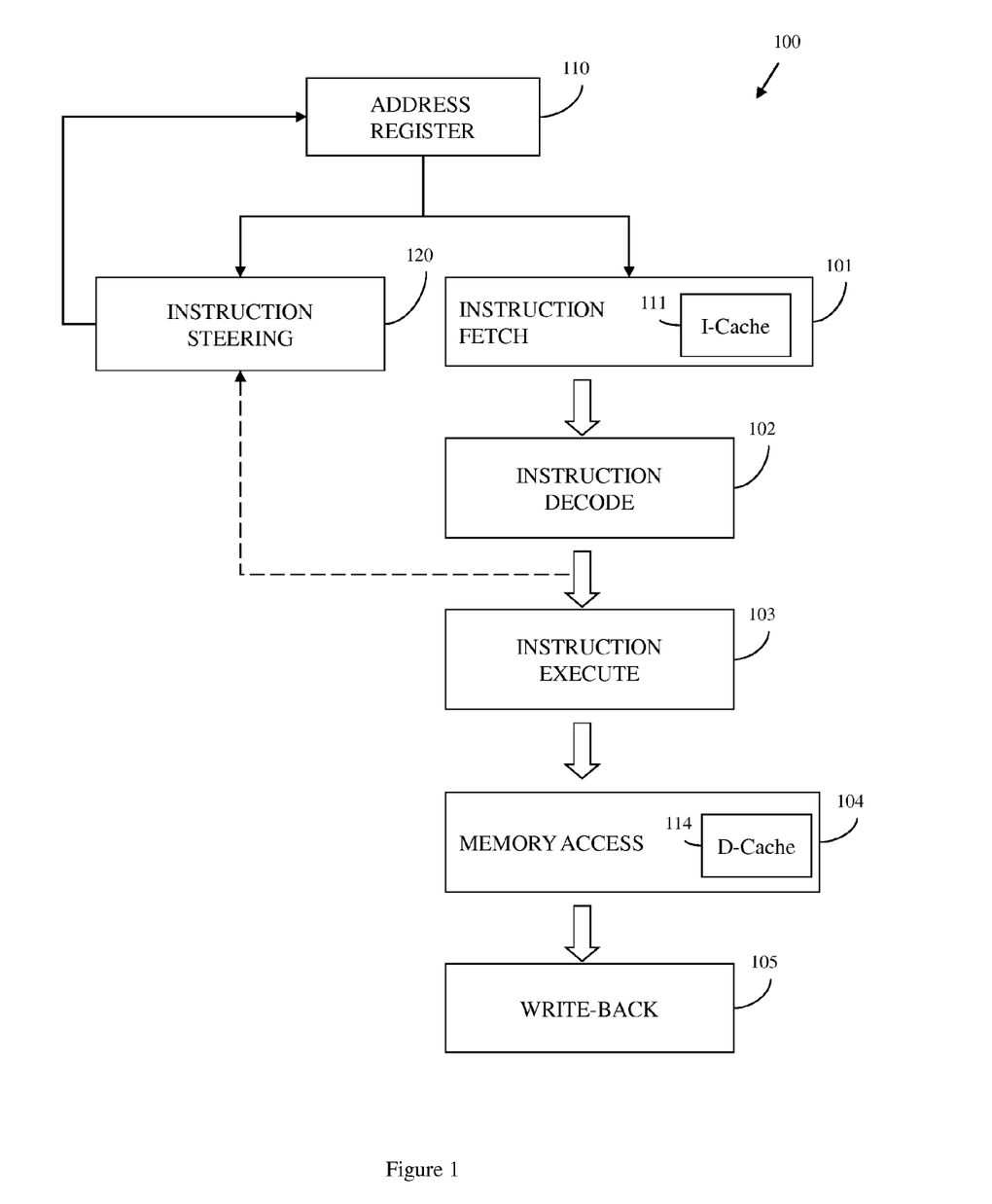
FIG. 1 is a schematic block diagram illustrating an embodiment of a processor.

More particularly, referring to FIG. 1, disclosed herein are embodiments of a pipelined processor 100. The pipelined processor 100 can comprise, for example, an instruction fetch address register 110, an instruction fetch stage 101 (also referred to herein as instruction cache read (ICRD)), an instruction decode stage 102, an instruction execution stage 103 (also referred to herein as an instruction execute stage), a memory access stage 104 and a write-back stage 104. The instruction fetch stage 101 can receive (i.e., can be adapted to receive, configured to receive, etc.) a specific address from the address register 110 and can fetch (i.e., can be adapted to fetch, configured to fetch, etc.) a specific instruction from that specific address in an instruction cache 111 (I-cache). The specific instruction can comprise, for example, a multi-bit instruction (e.g., a 32-bit instruction). Additionally, it should be noted that the term "fetch", as used herein, refers to a read process. The instruction decode stage 102 can comprise combinational logic that produces (i.e., that is adapted to produce, configured to produce, etc.) control signals based on the multi-bit instruction. The instruction execution stage 103 can execute (i.e., can be adapted to execute, configured to execute, etc.) the control signals and, thereby the specific instruction. The memory access stage 104 access a data cache 114 (D-cache) and read (i.e., can be adapted to access the D-cache and read, can be configured to access the D-cache and read, etc.) data, if any, required for execution of the specific instruction. The write-back stage 105 can write (i.e., can be adapted to write, configured to write, etc.) the results of executing the specific instruction into a register file. In the above-described pipeline processor, each instruction may enter the pipeline and spend one clock cycle at each stage.

The pipeline stages 101-105 referred to above are well-known in the art and, thus, the details of those stages are omitted from this specification to allow the reader to focus on the salient aspects of the embodiment disclosed herein. It should, however, be noted that the stages 101-105 are described above for illustration purposes and are not intended to be limiting. That is, the processor 100 can incorporate additional stages and/or any one of the stages described above can comprise multiple sub-stages such that each stage may actually take more than one clock cycle to complete.

Additionally, the pipeline processor 100 can comprise an instruction steering unit 120 comprising at least three stages: a branch instruction history table (BHT) and branch instruction target address cache (BTAC) read stage; a direction prediction stage and a target address calculation stage. The BHT-BTAC read stage can operate in parallel with (i.e., in the same clock cycle as) the instruction fetch stage (i.e., the instruction I-cache read stage) in order to minimize delay in the next instruction fetch (i.e., in order to provide fast access to branch target instructions).

Figure 2:
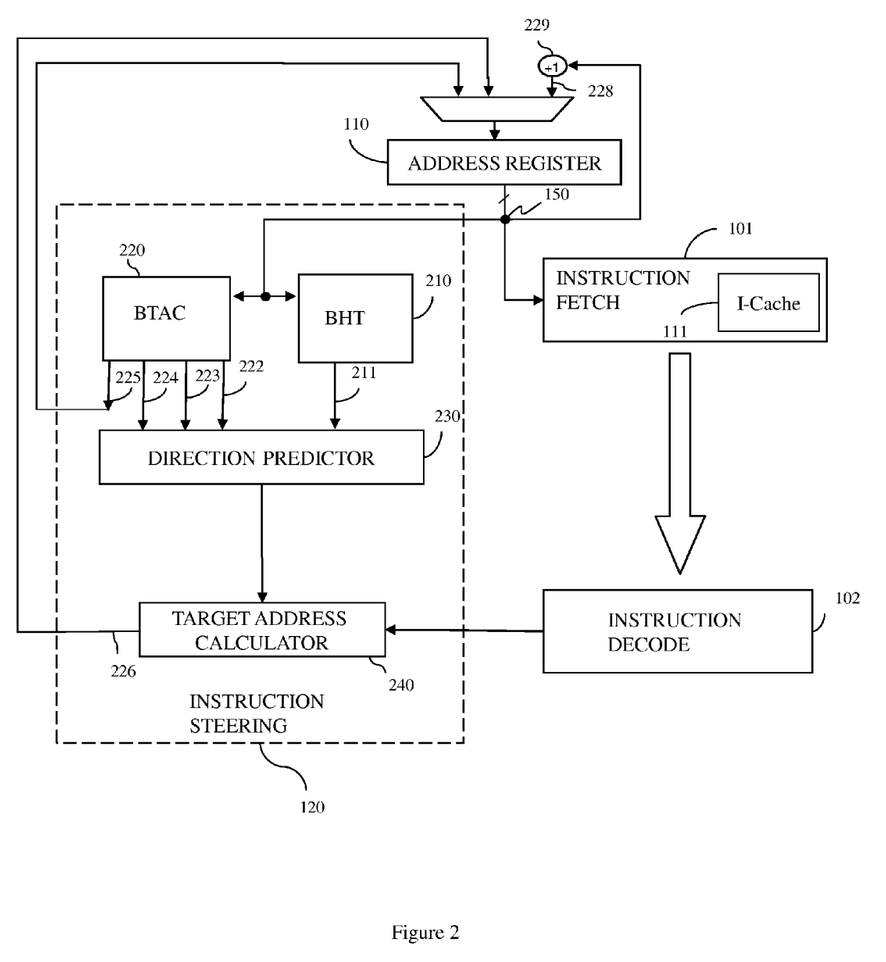
FIG. 2 is a schematic block diagram illustrating an exemplary instruction steering component that can be incorporated into the processor of FIG. 1.

Specifically, referring to FIG. 2, the instruction steering unit 120 can comprise a branch instruction history table (BHT) 210, a branch instruction target address cache (BTAC) 220, a direction predictor 230, and a target address calculator 240.

The BHT 210 can store (i.e., can be adapted to store, configure to store, etc.) initial direction predictions for conditional branch instructions stored in an instruction cache (I-cache), where each direction prediction is either taken or not taken. Specifically, the BHT 210 can maintain dynamic predictions (i.e., predicted taken or predicted not taken) for conditional branch instructions. The BHT 210 can be indexed by I-cache addresses and can generally be implemented as a counter that indicates, for each instruction at each I-cache address, the history of branch instruction activity. That is, for any given branch instruction, the history of branch activity can comprise a stream of taken/not taken bits in sequence of occurrence and the direction prediction can comprise a lesser number of bits indicating whether the history of branch activity included recently taken or recently not taken bit and, thus, whether the branch should be predicted taken or predicted not taken. BHTs are well-known in the art and, thus, the details are omitted from this specification in order to allow the reader to focus on the salient aspects of the disclosed embodiments.

The BTAC 220 can be implemented as a content addressable memory (CAM) and can store, for any conditional branch instructions previously predicted as taken, target addresses, override bits and, optionally, valid bits. Specifically, referring to FIG. 3, the BTAC 220 can comprise a database 301 with n-entries. Each entry in the database 301 can be associated with a specific conditional branch instruction that was previously predicted as taken and can be indexed by the I-cache address 302 for that specific instruction. Each entry in the database 301 can further specify, for the specific conditional branch instruction previously predicted as taken, a target address 303, an override bit 304 and, optionally, a valid bit 305.

Figure 3:
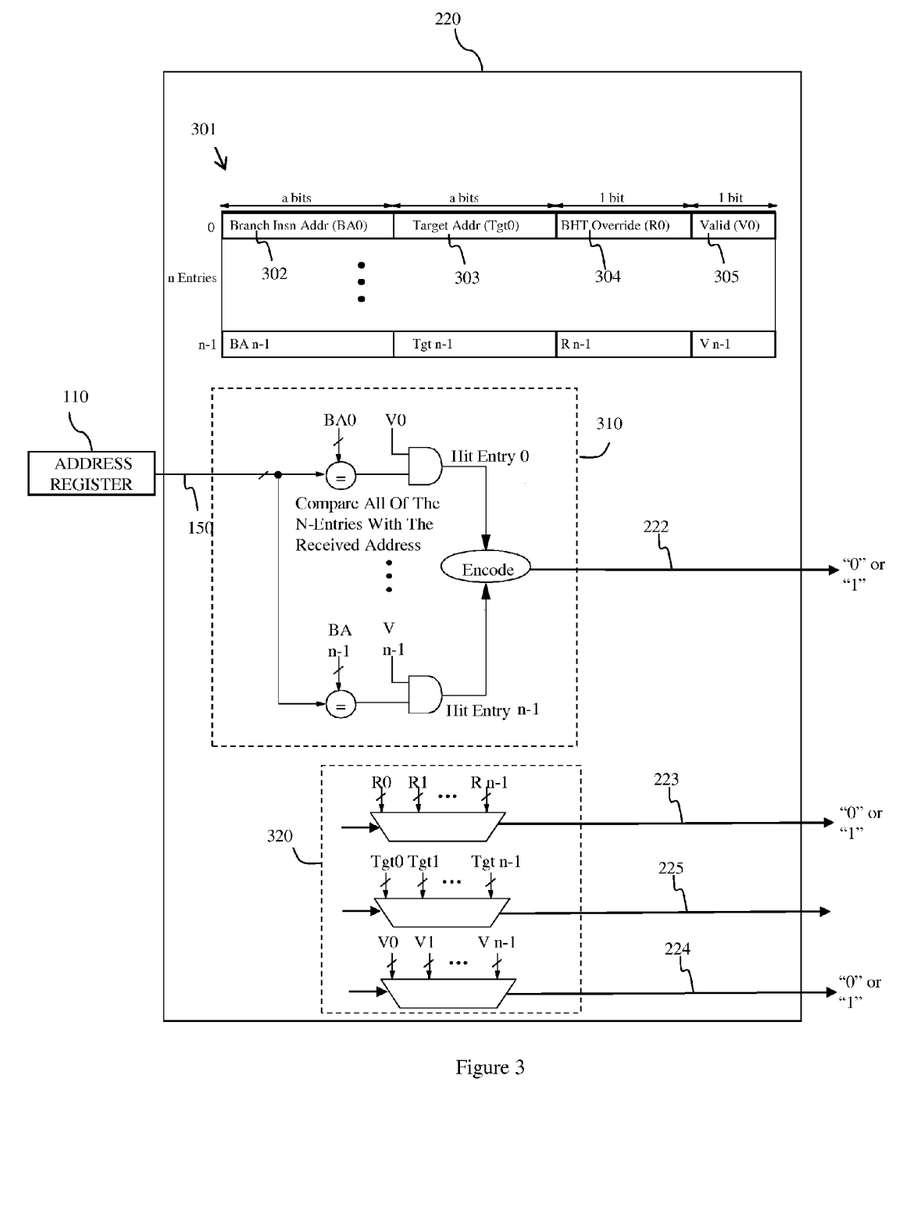
FIG. 3 is a schematic block diagram illustrating an exemplary branch instruction target address cache (BTAC) that can be incorporated into the instruction steering component of FIG. 2.

The target address 303, as set forth in the BTAC database 301 for a specific conditional branch instruction as indexed by an I-cache address 302, can be the target address that was previously predicted by the instruction steering stage 120 and used to fetch the next instruction in a sequence of instructions.

The override bit 304, as set forth in the BTAC database 301 for a specific conditional branch instruction as indexed by an I-cache address 302, can be a pre-established bit that is based on the branch instruction type of the specific branch instruction. The determination as to which branch instructions in the BTAC are assigned which override bits (i.e., a "1" or a "0") can be made, for example, based on pre-established rules for assigning override bits as set forth in operation code (op-code). These pre-established rules can, for example, be established by a system architect or designer, can be based, for example, on branch instruction type, and can be incorporated (e.g., by the system architect or designer) into the opcode. For example, a rule incorporated into the opcode may specify that all conditional branches receive a "1" override bit, requiring the direction prediction of the BHT, whereas all unconditional branches, which are always predicted taken, receive a "0" override bit. Alternatively, the rules may be more specific. For example, a rule may specify that when a conditional branch instruction is encoded with a hint-bit encoded in the instruction, then the branch instruction should always be predicted taken and, thus, should have a "0" override bit. In another example, if the conditional branch instruction is a branch-decrement-not-zero (bdnz) type branch instruction, then the branch instruction should always be predicted taken and, thus, should also have a "0" override bit. That is, in such cases, the BTAC would be controlling and not the BHT.

The optional valid bit 305, as set forth in the BTAC database 301 for a specific conditional branch instruction as indexed by an I-cache address 302, can indicate whether the target address 303 in a BTAC entry may be used for instruction steering (i.e., for direction prediction and target address prediction) That is, a valid bit 305 associated with a specific conditional branch instruction can be set as "0" when the conditional branch instruction has never been predicted as taken and, thus, no target address associated with that conditional branch instruction has ever been entered into the database 301. The valid bit 305 can subsequently be set as "1" when the conditional branch instruction is predicted as taken and a target address 303 is predicted and entered into the database 301. Finally, the valid bit 305 can be cleared (i.e., set back at "0") if determination is ever made that the predicted target address 303 was erroneous.

Figure 4:
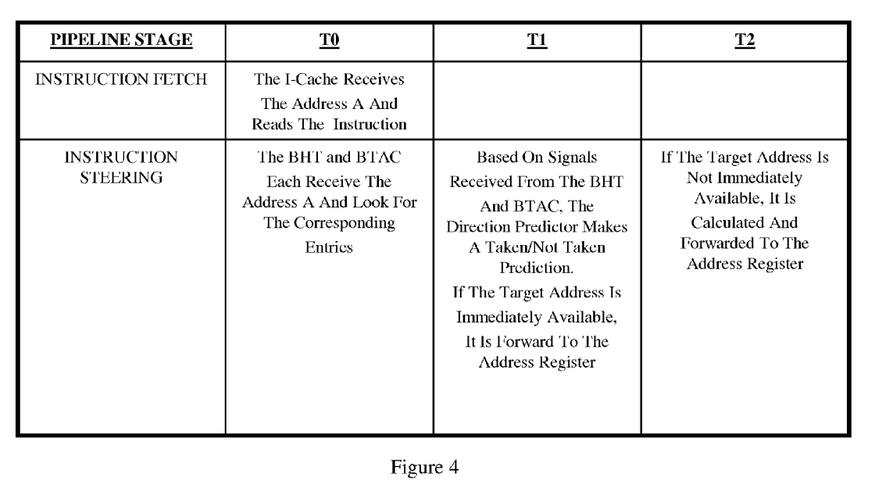
FIG. 4 is an exemplary timing diagram associated with the processor of FIG. 1.

Referring to FIGS. 2-3 in combination with the timing diagram of FIG. 4, the instruction fetch address register 110 can essentially simultaneously (i.e., in the same clock cycle T0) submit (i.e., can be adapted to simultaneously submit, can be configured to simultaneously submit, etc.) a specific address 150 for a specific instruction to the instruction fetch stage 101 (i.e., to the I-cache 111) and to the BHT 210 and the BTAC 210 of the instruction steering unit 120.

In response to the specific address 150, the BHT 210 can output (i.e., can be adapted to output, can be configured to output, etc.) a first signal 211 to the direction predictor 230. This first signal 211 can be indicative of an initial direction prediction stored in the BHT 210 for the specific instruction. This first signal 211 can, for example, comprise a "0" bit indicating that the specific conditional branch instruction should be predicted as not taken such that the next instruction in the sequence will be found in the next sequential address in the I-cache or a "1" bit indicating that the specific conditional branch instruction should be predicted as taken such that the next instruction in the sequence will be found at some other address in the I-cache.

Additionally, in response to the specific address 150, the BTAC 220 can output (i.e., can be adapted to output, configured to output, etc.) various other signals 222-225 to the direction predictor 230. Specifically, the BTAC 220 can comprise combinational logic 310 that can compare (i.e., can be adapted to compare, can be configured to compare, etc.) all of the n-entries in the BTAC database 301 to the specific address 150 in order to determine whether or not there is an entry in the BTAC database 301 associated with that specific address 150. A second signal 222 indicative of this entry/no entry determination can then be output by the BTAC 220. For example, a "1" output can indicate that the specific instruction was previously entered into the BTAC 220 and, thus, was previously predicted as taken, whereas a "0" second signal 222 can indicate that the specific instruction has never been predicted as taken. Furthermore, if the second signal is a"1", additional logic 320 can be used to determine the override bit 304, the valid bit 305 (if applicable), and the target address 303 associated with the specific instruction and output corresponding signals 223-225.

In the next clock cycle T1, the direction predictor 230, which is in communication with the branch instruction history table (BHT) 210 and the branch instruction target address cache (BTAC) 220, can process the signal 211 from the BHT 210 and the signals 222-224 from the BTAC 220 in order to determine a final direction prediction for the specific instruction. That is, depending upon whether the specific instruction is entered in the branch instruction target address cache (BTAC) 220 (as indicated by the second signal 222) and, if so, what override bit and, optionally, what valid bit are associated with that specific instruction (as indicated by the third and fourth signals 223-224, respectively), either the first signal 211 from the BHT 210 or the second signal 222 from the BTAC 220 will control the direction prediction.

Figure 5:
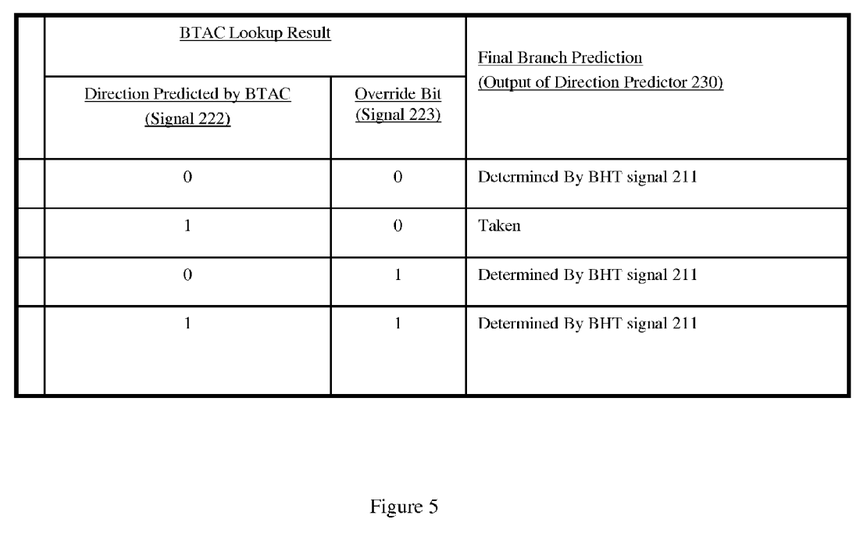
FIG. 5 is an exemplary logic table associated with the processor of FIG. 1.

Specifically, as shown in the logic table of FIG. 5, the direction predictor 230 can compare (e.g., using combinational logic) the second and third signals 222-223 from the BTAC 220, which represent the entry/no entry determination and the override bit, along with the first signal 211 from the BHT 210, in order to generate an accurate direction prediction for the specific conditional branch instruction. If both signals 222 and 223 are low (i.e., "0", "0"), then the prediction made by the BHT 210, either taken or not taken as indicated by the first signal 211, will be controlling. If the second signal 222 is high and the third signal 223 is low (i.e., "1", "0"), then the prediction made by the BTAC 220 as indicated by the second signal 222 will be controlling. As mentioned above, the second signal 222 will be high only if there is an entry in the BTAC 220 indicating that the specific conditional branch instruction was previously predicted as taken and, thus, should be predicted as taken again. In other words, if the second signal 222 is controlling, the direction prediction will always be taken. Also, note that this will only be the case, as long as the valid bit, if any, is also high. That is, as mentioned above, a low valid bit (i.e., a valid bit set back to "0") is an indication that the predicted target address in the BTAC entry was erroneous and should not be used. In this case, the second signal 222 will be low (because the valid bit is low), and therefore the prediction made by the BHT 210, either taken or not taken as indicated by the first signal 211, will be controlling. If the second signal 222 is low and the third signal 223 is high (i.e., "0", "1"), then the prediction made by the BHT 210, either taken or not taken as indicated by the first signal 211, will be controlling. If the second signal 222 is high and the third signal 223 is high (i.e., "1", "1"), then the prediction made by the BHT 210, either taken or not taken as indicated by the first signal 211, will be controlling.

More specifically, given the logic table of FIG. 5, the final direction prediction for a specific conditional branch instruction as determined by the direction predictor 230 will be predicted taken, whenever the first signal 211 indicates that the direction prediction by the BHT 210 is taken. This is because the second signal 222 will either indicate a valid BTAC entry and, thereby predicted taken or the second signal 222 will not indicate a valid BTAC entry, thereby making the BHT 210 prediction controlling. The final direction prediction for a specific conditional branch instruction as determined by the direction predictor 230 will also be predicted taken, when the first signal 211 indicates that the direction prediction of BHT 210 is not taken, when the second signal 222 indicates that the specific instruction address is a valid entry of the BTAC 220 (i.e., the second signal 222 indicates that the address is entered in the BTAC and that a valid bit is high) and when the third signal 223 indicates that the first signal 211 from the BHT 210 does not override the second signal 222.

In all other combinations of signals 211, 222, and 223 the final direction prediction determined by the direction predictor 230 will be predicted not taken. For example, this includes the scenario where the first signal 211 indicates that the initial direction prediction by the BHT 210 is not taken, the second signal 222 indicates that the specific instruction is entered BTAC 220, and the third signal 223 indicates that the first signal 211 from the BHT 210 overrides the second signal 222 from the BTAC 220. In other words, this includes the scenario where the BHT 210 predicts not taken (i.e., first signal 211 is low) while the BTAC 220 predicts taken (i.e., second signal 222 is high), and the BHT prediction overrides the BTAC prediction (i.e., third signal 223 is high). This also includes the scenario where the first signal 211 indicates that the initial direction prediction by the BHT 210 is not taken and the second signal 222 indicates that the specific instruction is not entered in the BTAC 220. Finally, this also includes the scenario where the first signal 211 indicates that the initial direction prediction by the BHT 210 is not taken, the second signal 222 indicates that the specific instruction is entered BTAC 220, the third signal 223 indicates that the second signal 222 overrides the first signal 211, but the fourth signal 224 indicates that the BTAC entry is erroneous. In all of these scenarios, the final direction prediction determined by direction predictor 230 will be predicted not taken.

As a result of the above described configuration, instruction steering is completed with only minimal delay, thereby providing fast access to branch target instructions. Specifically, as shown in the timing diagram of FIG. 4, if the final direction prediction at clock cycle T1 is not taken, calculation in the next clock cycle T2 of the target address for the next instruction in the sequence will be unnecessary because, for a not taken prediction at clock cycle T1, the target address will always be the next sequential address in the I-cache (i.e., the target address will be immediately available). In this case, an address incrementer 229 can immediately forward (i.e., can be adapted to immediately forward, can be configured to immediately forward, etc.) to the address register 110 a sixth signal 228 indicating this next sequential address (see FIG. 2). Also as shown in the timing diagram of FIG. 4, if the final direction prediction at clock cycle T1 is taken, if there is an entry in the BTAC 220 for that specific conditional branch instruction and if there is a high valid bit associated with that entry indicating that the target address associated with the entry is accurate (as applicable), calculation in the next clock cycle T2 of the target address for the next instruction in the sequence will similarly be unnecessary because the target address is contained in the BTAC 220 and is, thus, immediately available. In this case, the BTAC 220 can immediately forward (i.e., can be adapted to immediately forward, configured to immediately forward, etc.) to the address register 110 the fifth signal 225 indicating this target address. Consequently, in cases such as these, instruction steering is completed at clock cycle T1, thereby providing minimized delay in the next instruction fetch over prior art instruction steering configurations. However, also as shown in the timing diagram of FIG. 4, if the final direction prediction that is associated with a specific conditional branch instruction is predicted taken at clock cycle T1, but there is either no entry in the BTAC 220 for that specific conditional branch instruction or if there is a low valid bit associated with a BTAC 220 entry, then in the next clock cycle T2 the target address calculator 240 can calculate and output a signal 226 with a new target address to the address register 110 for fetch of the next instruction in the sequence. Target address calculators typically perform target address calculation following instruction decode. They are well-known in the art and, thus, the details of such target address calculators are omitted from this specification in order to allow the reader to focus on the salient aspects of the disclosed embodiments. Consequently, in cases such as these, instruction steering is completed at clock cycle T2, thereby still providing minimized delay in the next instruction fetch over prior art instruction steering configurations. The override bits further improve cycle time because they allow the processor 100 know immediately whether or not the specific instruction contains a conditional branch that needs history-based prediction, thereby eliminating logic levels to decode the instruction to look for the conditional branch.

Finally, in all cases, the pre-established override bits considered by the direction predictor 230 ensure that factors other than just the BHT direction prediction (e.g., the branch instruction type, how it is used by a compiler, etc.) are considered in making the final direction prediction and, thereby ensure that prediction accuracy is improved.

Figure 6:
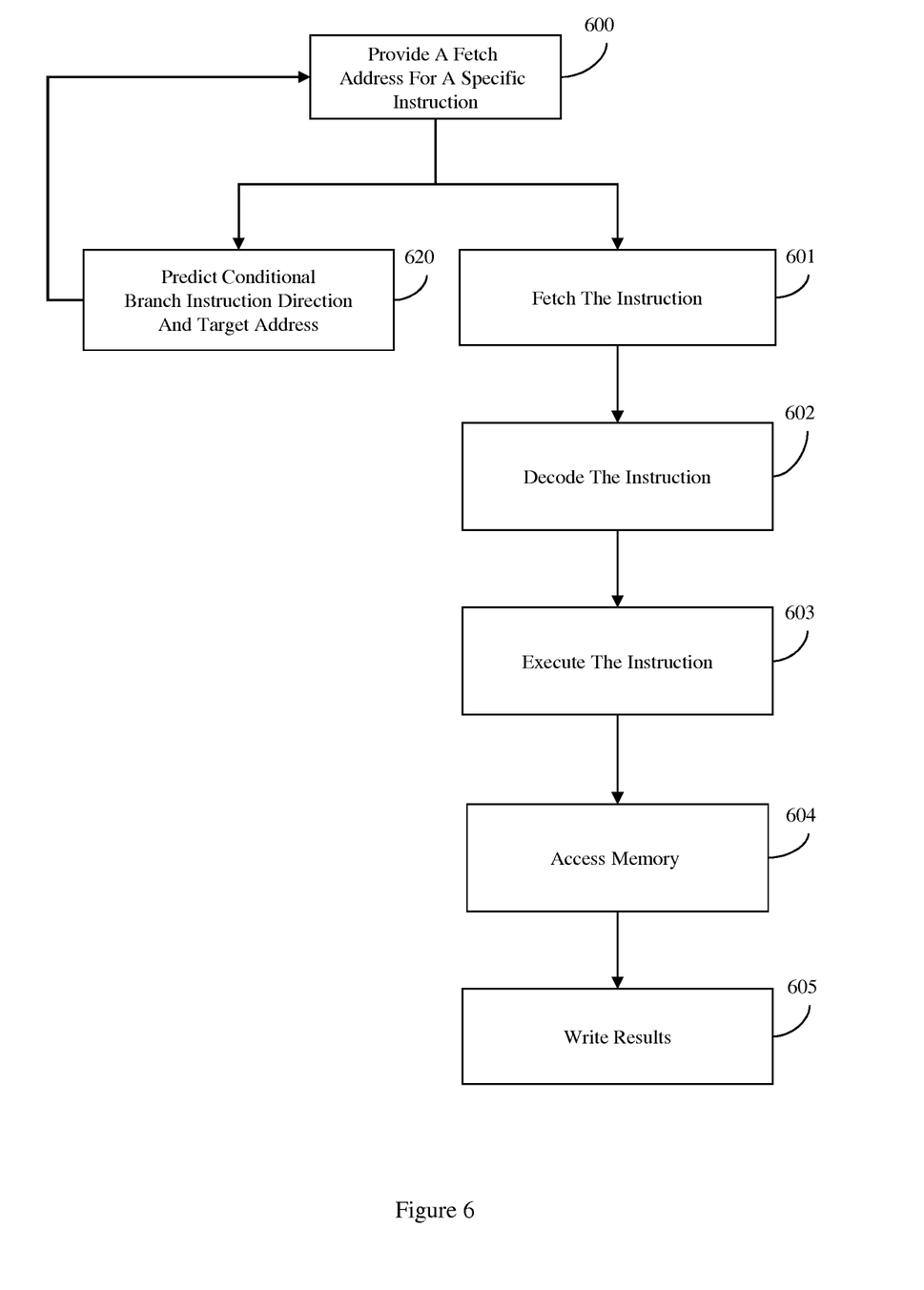
FIG. 6 is a flow diagram illustrating an embodiment of a data processing method.

Referring to the flow diagram of FIG. 6 in combination with the pipeline processor 100 described in detail above and illustrated in FIG. 1, also disclosed herein are embodiments of a data processing method. The method embodiments can comprise submitting (e.g., by the address register 110 to the I-cache 111) a specific fetch address for a specific instruction (600) and fetching (e.g., by the I-cache 111) that specific instruction (601). The specific instruction can comprise, for example, a multi-bit instruction (e.g., a 32-bit instruction). The multi-bit instruction can be decoded (e.g., by the instruction decode stage 102) in order to produce control signals (602). The control signals can then be executed (e.g., by the instruction execute stage 103) (603). Furthermore, if necessary to execute the control signals, data in a data cache 114 (D-cache) can be accessed and read (604). Finally, the results of the execution process 603 can be written into a register file (605). In the above-described data processing method, each instruction may enter the pipeline and spend one clock cycle at each stage. The method steps 601-605 referred to above are well-known in the art and, thus, the details of those steps are omitted from this specification to allow the reader to focus on the salient aspects of the embodiment disclosed herein. It should, however, be noted that the steps 601-605 are described above for illustration purposes and are not intended to be limiting. That is, the method embodiments may incorporate additional process steps and/or any one of the process steps described above can comprise multiple sub-steps such that each step may actually take more than one clock cycle to complete.

Additionally, the method embodiments can comprise an instruction steering process 620 in which the direction (i.e., taken or not taken) and target address of a conditional branch instruction are predicted.

Figure 7:
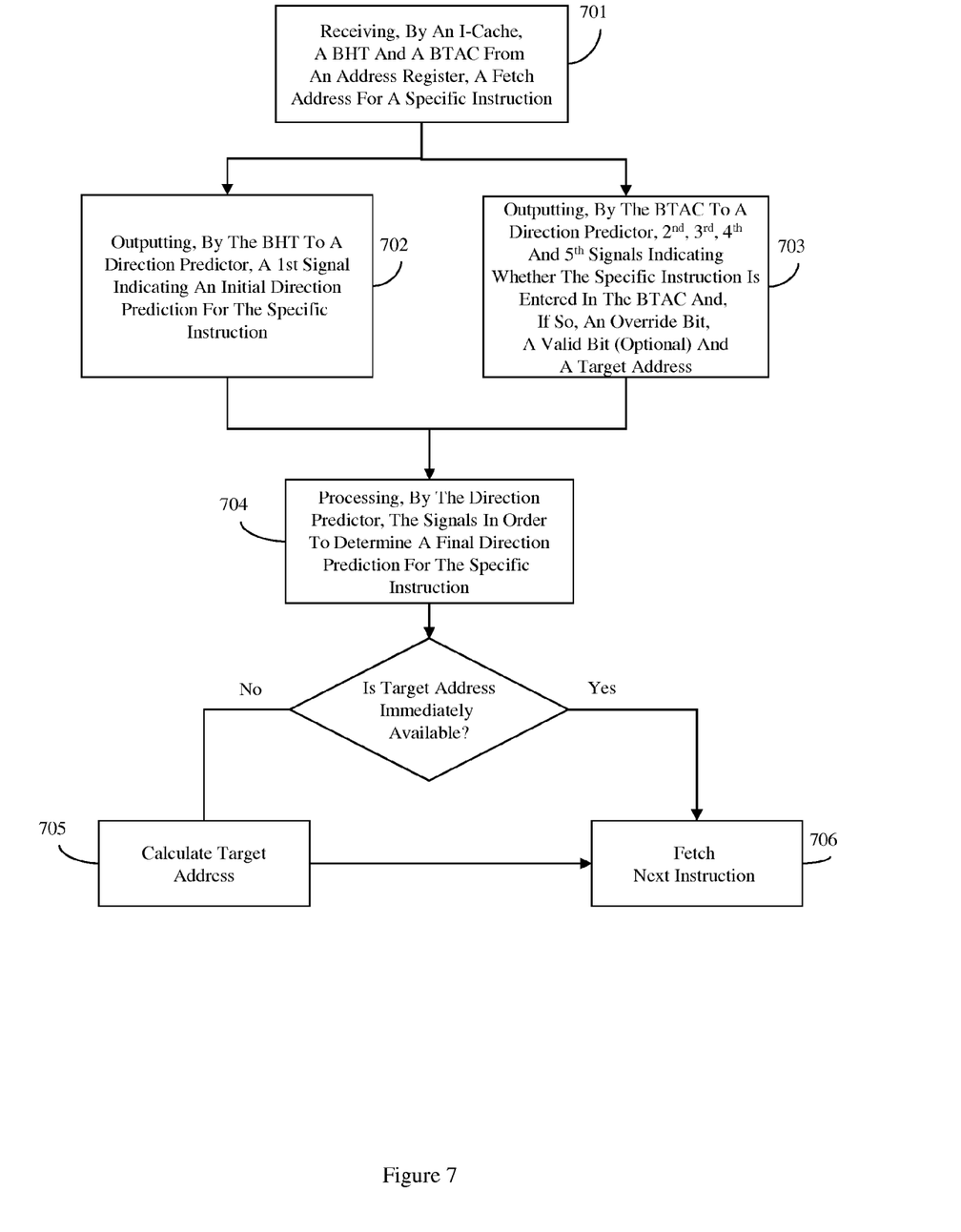
FIG. 7 is a flow diagram illustrating an exemplary instruction steering process that can be incorporated into the method of FIG. 6.

Referring to FIG. 7 in combination with FIGS. 2-3, the instruction steering process 620 can comprise essentially simultaneously (i.e., in the same clock cycle T0) receiving, by the I-cache 111, the BHT 210 and the BTAC 220 from the address register 110, a specific address 150 for a specific instruction contained in the I-cache 111 (701). The BHT 210 and BTAC 220 are described in detail above.

In response to the specific address 150, a first signal 211 can be output by the BHT 210 to the direction predictor 230 (702). This first signal 211 can be indicative of an initial direction prediction stored in the BHT 210 for that specific instruction. This first signal 211 can, for example, comprise a "0" bit indicating that the specific conditional branch instruction should be predicted as not taken such that the next instruction in the sequence will be found in the next sequential address in the I-cache or a "1" bit indicating that the specific conditional branch instruction should be predicted as taken such that the next instruction in the sequence will be found at some other address in the I-cache. Additionally, in response to the specific address 150, various other signal 222-225 can be output by the BTAC 220 to the direction predictor 230 (703). These other signals can include a second signal 222 indicative of whether or not there is an entry in the BTAC 220 database (see database 301 of FIG. 3) associated with that specific address 150. For example, a "1" output can indicate that the specific instruction was previously entered into the BTAC 220 and, thus, was previously predicted as taken, whereas a "0" second signal 222 can indicate that the specific instruction has never been predicted as taken. Third, fourth and fifth signals 223-225 can be indicative of an override bit, a valid bit (optional) and a target address associated with the matching BTAC entry.

In the next clock cycle T1, the first signal 211 from the BHT 210 and the signals 222-224 from the BTAC 220 can be processed by the direction predictor 230 in order to determine a final direction prediction (i.e., taken or not taken) for the specific instruction (704). That is, depending upon whether the specific instruction is entered in the branch instruction target address cache (BTAC) 220 (as indicated by the second signal 222) and, if so, what override bit and, optionally, what valid bit are associated with that specific instruction (as indicated by the third and fourth signals 223-224, respectively), either the first signal 211 from the BHT 210 or the second signal 222 from the BTAC 220 will control the direction prediction.

Specifically, as shown in the logic table of FIG. 5, the second and third signals 222-223 can be compared at process 704. If both signals 222 and 223 are low (i.e., "0", "0"), then the prediction made by the BHT 210, either taken or not taken as indicated by the first signal 211, will be controlling. If the second signal 222 is high and the third signal 223 is low (i.e., "1", "0"), then the prediction made by the BTAC 220 as indicated by the second signal 222 will be controlling. In this situation, the direction predictor 230 will indicate that the conditional branch instruction should be predicted taken. Note that a low valid bit (i.e., a valid bit set back to "0") is an indication that the predicted target address in the BTAC entry was erroneous and should not be used. In this case, the second signal 222 will be forced low, and therefore the prediction made by the BHT 210, either taken or not taken as indicated by the first signal 211, will be controlling. If the second signal 222 is low and the third signal 223 is high (i.e., "0", "1"), then the prediction made by the BHT 210, either taken or not taken as indicated by the first signal 211, will be controlling. If the second signal 222 is high and the third signal 223 is high (i.e., "1", "1"), then the prediction made by the BHT 210, either taken or not taken as indicated by the first signal 211, will be controlling.

More specifically, given the logic table of FIG. 5, the final direction prediction for a specific conditional branch instruction as determined at process 704 will be predicted taken, whenever the first signal 211 indicates that the direction prediction by the BHT 210 is taken. This is because the second signal 222 will either indicate a valid BTAC entry and, thereby predicted taken or the second signal 222 will not indicate a valid BTAC entry, thereby making the BHT 210 prediction controlling. The final direction prediction for a specific conditional branch instruction as determined at process 704 will also be predicted taken, when the first signal 211 indicates that the direction prediction of BHT 210 is not taken, when the second signal 222 indicates that the specific instruction address is a valid entry of the BTAC 220 (i.e., the second signal 222 indicates that the address is entered in the BTAC and that a valid bit is high) and when the third signal 223 indicates that the first signal 211 from the BHT 210 does not override the second signal 222.

In all other combinations of signals 211, 222, and 223 the final direction prediction determined at process 704 will be predicted not taken. For example, this includes the scenario where the first signal 211 indicates that the initial direction prediction by the BHT 210 is not taken, the second signal 222 indicates that the specific instruction is entered BTAC 220, and the third signal 223 indicates that the first signal 211 from the BHT 210 overrides the second signal 222 from the BTAC 220. In other words, this includes the scenario where the BHT 210 predicts not taken (i.e., first signal 211 is low) while the BTAC 220 predicts taken (i.e., second signal 222 is high), and the BHT prediction overrides the BTAC prediction (i.e., third signal 223 is high). This also includes the scenario where the first signal 211 indicates that the initial direction prediction by the BHT 210 is not taken and the second signal 222 indicates that the specific instruction is not entered in the BTAC 220. Finally, this also includes the scenario where the first signal 211 indicates that the initial direction prediction by the BHT 210 is not taken, the second signal 222 indicates that the specific instruction is entered BTAC 220, the third signal 223 indicates that the second signal 222 overrides the first signal 211, but the fourth signal 224 indicates that the BTAC entry is erroneous. In all of these scenarios, the final direction prediction determined by direction predictor 230 will be predicted not taken.

After the final direction prediction is made at process 704, the target address for the next instruction in the sequence can be calculated, if necessary, (705) and the next instruction in the sequence can be fetched (706). Specifically, as shown in the timing diagram of FIG. 4, if the final direction prediction at process 704 is not taken, calculation of the target address for the next instruction in the sequence at process 705 will be unnecessary because, for a not taken prediction at clock cycle T1, the target address for the next instruction fetch at process 706 will always be the next sequential address (i.e., the target address is immediately available). In this case, a sixth signal 228 indicating this next sequential address can be immediately forwarded (e.g., by an address incrementer 229) to the address register 110 a sixth signal 228. Also as shown in the timing diagram of FIG. 4, if the final direction prediction at process 704 is taken, if there is an entry in the BTAC 220 for that specific conditional branch instruction and if there is a high valid bit associated with that entry indicating that the target address associated with the entry is accurate (as applicable), calculation of the target address for the next instruction in the sequence at process 705 will similarly be unnecessary because the target address is contained in the BTAC 220 and is, thus, immediately available. In this case, the fifth signal 225 indicating this target address can be immediately forwarded by the BTAC 220 to the address register 110. Consequently, in cases such as these, instruction steering is completed at clock cycle T1, thereby providing minimized delay in the next instruction fetch over prior art instruction steering configurations. However, also as shown in the timing diagram of FIG. 4, if the final direction prediction at process 704 is taken, but there is either no entry in the BTAC 220 for that specific conditional branch instruction or if there is a low valid bit associated with a BTAC 220 entry, then in the next clock cycle T2, a new target address can be calculated and a signal 226 with the new target address can be output to the address register 110 (705). This new target address can then be used to fetch of the next instruction in the sequence at process 706. Consequently, in cases such as these, instruction steering is completed at clock cycle T2, thereby still providing minimized delay in the next instruction fetch over prior art instruction steering configurations.

Finally, in all cases, the pre-established override bits considered at process 704 ensure that factors other than just the BHT direction prediction (e.g., the branch instruction type, how it is used by a compiler, etc.) are considered in making the final direction prediction and, thereby ensure that prediction accuracy is improved. The override bits further improve cycle time because they indicate immediately whether or not the specific instruction contains a conditional branch that needs history-based prediction, thereby eliminating logic levels to decode the instruction to look for the conditional branch.

In the processor and method embodiments described above the BTAC 220 can be automatically updated each time a conditional branch instruction is predicted taken. Specifically, referring to FIG. 8, this automatic updating process can occur after the specific instruction has been decoded (e.g., at process 602 of FIG. 6) and can begin with a determination, based on the decoded instruction, as to whether or not the specific instruction is actually a branch instruction (801). If not, no update to the BTAC 220 is needed. If so, a determination can be made as to whether or not the specific instruction was predicted taken (e.g., at process 704 of FIG. 7) (802). If the specific instruction was predicted not taken, no update to the BTAC 220 is needed. If the specific instruction was predicted taken, a determination can be made as to whether or not the next time that instruction is accessed, a direction prediction by the BTAC 220 or the BHT 210 should be controlling (e.g., at process 704 of FIG. 7) (803). This determination can be made, for example, based on pre-established rules for assigning override bits as set forth in operation code (opcode). These pre-established rules can, for example, be established by a system architect or designer, can be based, for example, on branch instruction type, and can be incorporated (e.g., by the system architect or designer) into the opcode.

For example, a rule incorporated into the opcode may specify that all conditional branches receive a "1" override bit, requiring the direction prediction of the BHT, whereas all unconditional branches, which are always predicted taken, receive a "0" override bit. Alternatively, the rules may be more specific. For example, a rule may specify that when a conditional branch instruction is encoded with a hint-bit encoded in the instruction, then the branch instruction should always be predicted taken and, thus, should have a "0" override bit. In another example, if the conditional branch instruction is a branch-decrement-not-zero (bdnz) type branch instruction, then the branch instruction should always be predicted taken and, thus, should also have a "0" override bit. That is, in such cases, the BTAC would be controlling and not the BHT.

Figure 8:
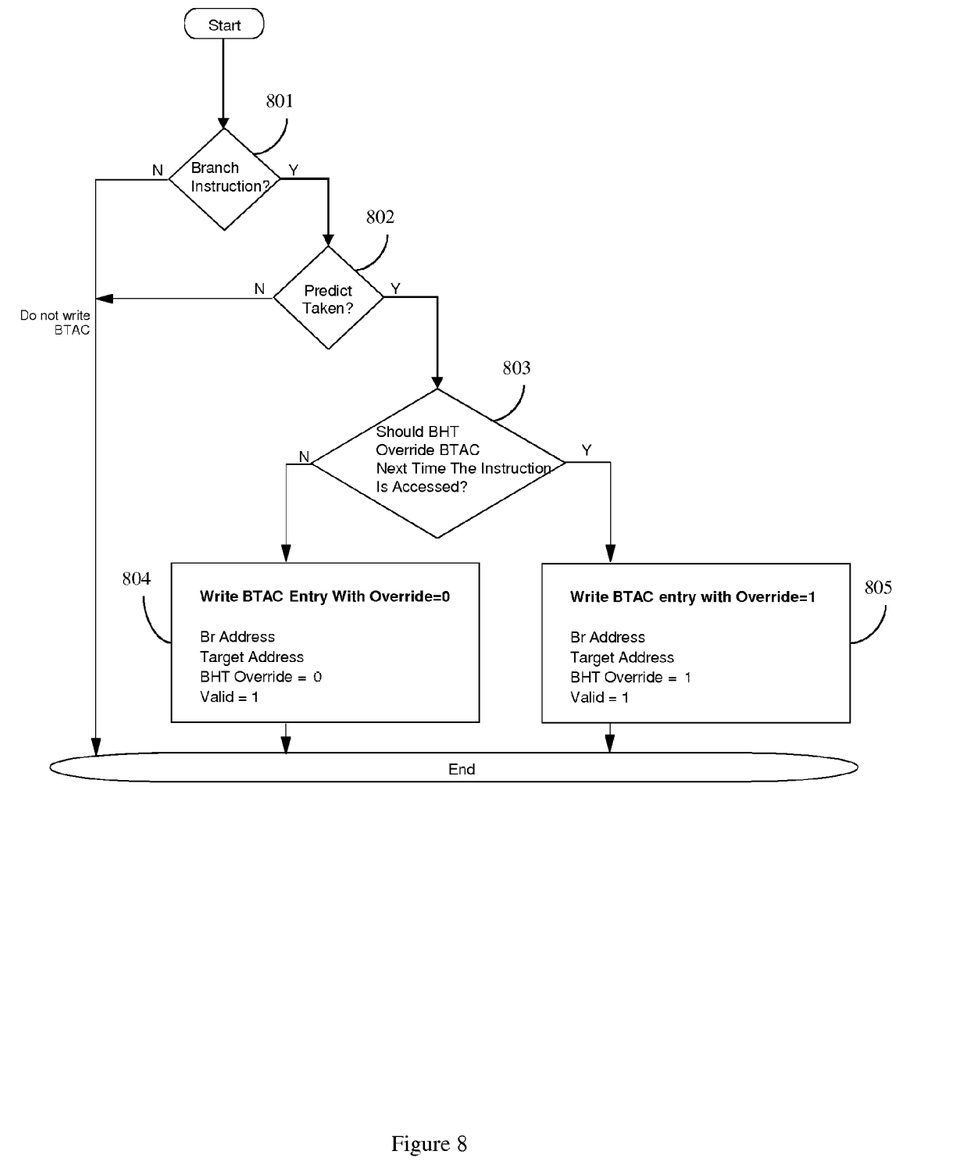
FIG. 8 is a flow diagram illustrating an exemplary method that can be used to update the BTAC of FIG. 3.

Once the appropriate override bit (i.e., a "1" or "0") is determined for the specific instruction, it can be entered into the BTAC 220 along with the target address and, optionally, a high valid bit (until determined otherwise) and the entry can be indexed by the fetch address for the specific instruction (804) or (805). Updating the BTAC 220 in this manner ensures that the next time this specific instruction is fetched, the target address does not need to be recalculated (unless a valid bit indicates that the previously listed target address was incorrect), thereby improving performance for branches that execute multiple times in program loops. With the BTAC 220 entry, the target address would have to be computed every time the specific instruction was fetched, thereby causing a pipeline stall.

In the processor and method embodiments described above, the BTAC 220 can be implemented using a first in first out (FIFO) replacement policy for entries, when storage space is an issue. That is, when all rows in the BTAC 220 are occupied, the entry written earliest in time will be replaced with a new entry and so on. Alternatively, in the processor and method embodiments described above, the BTAC 220 can be implemented using a least recently used (LRU) replacement. That is, when all rows in the BTAC 220 are occupied, the entries that were most recently used are retained, even at the cost of adding extra bits in each entry.

It should further be understood that the flowchart and block diagrams in the Figures illustrate the architecture, functionality, and operation of the embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should further be understood that the terminology used herein is for the purpose of describing the disclosed embodiments only and is not intended to be limiting. As used herein, the singular forms "a", "an" and "the" are intended to include the plural forms as well, unless the context clearly indicates otherwise. It should further be understood that the terms "comprises" "comprising", "includes" and/or "including", as used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The description above has been presented for purposes of illustration and description, but is not intended to be exhaustive or limited to the embodiments in the form disclosed. Many modifications and variations to the disclosed embodiments will be apparent to those of ordinary skill in the art without departing from the scope and spirit of the disclosed embodiments.

Therefore, disclosed above are embodiments of a computer processor and a data processing method incorporating an instruction pipeline with direction prediction (i.e., taken or not taken) for conditional branch instructions. In the embodiments, reading of a branch instruction history table (BHT) and a branch instruction target address cache (BTAC) for branch direction prediction occurs in parallel with (i.e., in the same clock cycle as) the current instruction fetch (i.e., the current instruction I-cache read) in order to minimize delay in the next instruction fetch (i.e., in order to provide fast access to branch target instructions). Additionally, direction prediction is performed in the very next clock cycle based either on an initial direction prediction for the specific instruction, as stored in a branch instruction history table (BHT) and indexed by the instruction fetch address, or, if applicable, on a prior entry for the specific instruction in a branch instruction target address cache (BTAC), also as indexed by the instruction fetch address. An override bit associated with each entry (i.e., each hit) in the BTAC is the determining factor for whether or not the BTAC or BHT is controlling. Override bits in the BTAC can be pre-established (e.g., by a system architect or designer) based, for example, on the branch instruction type of the conditional branch instruction in order to ensure prediction accuracy. Consequently, for some types of branch instructions, the override bits give dynamic direction prediction of the BHT higher priority than the static direction prediction of the BTAC (i.e., the override bits provide flexibility to predict not taken even when the BTAC predicts taken).

What is claimed is:

1. A processor comprising:
a branch instruction history table (BHT) storing initial direction predictions for conditional branch instructions stored in an instruction cache, each direction prediction being one of taken and not taken;
a branch instruction target address cache (BTAC) storing, for any conditional branch instructions previously predicted as taken, target addresses and override bits, said branch instruction history table (BHT) and said branch instruction target address cache (BTAC) each being indexed by instruction cache addresses;
an instruction fetch address register essentially simultaneously submitting a specific address for a specific instruction in said instruction cache to said instruction cache, said branch instruction history table (BHT) and said branch instruction target address cache (BTAC) such that reading of said branch instruction history table (BHT), said branch instruction target address cache (BTAC) and said instruction cache occurs in parallel during a same clock cycle,
said branch instruction history table (BHT) outputting, in response to said specific address, a first signal indicative of an initial direction prediction stored in said branch instruction history table (BHT) for said specific instruction, and
said branch instruction target address cache (BTAC) outputting, in response to said specific address, a second signal indicative of whether said specific instruction is entered in said branch instruction target address cache (BTAC) and a third signal indicative of an override bit associated with said specific instruction; and
a direction predictor in communication with said branch instruction history table (BHT) and said branch instruction target address cache (BTAC),
said direction predictor performing the following:
receiving said first signal, said second signal, and said third signal;
using combinational logic to perform a comparison of said second signal and said third signal; and
depending upon results of said comparison, selecting one of said first signal and said second signal to control a determination of a final direction prediction for said specific instruction.

2. The processor of claim 1, said override bits being assigned according to a pre-established rule set forth in operation code of said processor, said pre-established rule specifying override bit values of "1" for all conditional branch instructions, ensuring that, for any conditional branch instruction, said third signal indicates that said first signal overrides said second signal.

3. The processor of claim 1, said final direction prediction being predicted not taken when said first signal indicates that said initial direction prediction is not taken and said second signal indicates that said specific instruction is not entered in said branch instruction target address cache (BTAC).

4. The processor of claim 1, said final direction prediction being predicted not taken when said first signal indicates that said initial direction prediction is not taken, said second signal indicates that said specific instruction is entered in said branch instruction target address cache (BTAC), and said third signal indicates that said first signal overrides said second signal.

5. The processor of claim 1, said final direction prediction being predicted taken whenever said first signal indicates said initial direction prediction is predicted taken.

6. The processor of claim 1, said final direction prediction being predicted taken when said first signal indicates that said initial direction prediction is predicted not taken, said second signal indicates that said specific instruction is entered in said branch instruction target address cache (BTAC) and said third signal indicates that said first signal does not override said second signal.

7. The processor of claim 1, further comprising an instruction decoder receiving said specific instruction from said instruction cache and decoding said specific instruction, said final direction prediction being determined by said direction predictor prior to said instruction decoder decoding said specific instruction.

8. A processor comprising:
a branch instruction history table (BHT) storing initial direction predictions for conditional branch instructions stored in an instruction cache, each direction prediction being one of taken and not taken;
a branch instruction target address cache (BTAC) storing, for any conditional branch instructions previously predicted as taken, target addresses, and override bits and valid bits,
said branch instruction history table (BHT) and said branch instruction target address cache (BTAC) each being indexed by instruction cache addresses, and
said override bits being assigned to each conditional branch instruction in said branch instruction target address cache (BTAC) according to pre-established rules set forth in operation code of said processor, said pre-established rules indicating different bit values based on branch instruction type of said conditional branch instructions;
an instruction fetch address register essentially simultaneously submitting a specific address for a specific instruction in said instruction cache to said instruction cache, said branch instruction history table (BHT) and said branch instruction target address cache (BTAC) such that reading of said branch instruction history table (BHT), said branch instruction target address cache (BTAC) and said instruction cache occurs in parallel during a same clock cycle,
said branch instruction history table (BHT) outputting, in response to said specific address, a first signal indicative of an initial direction prediction stored in said branch instruction history table (BHT) for said specific instruction, and
said branch instruction target address cache (BTAC) outputting, in response to said specific address, a second signal indicative of whether said specific instruction is entered in said branch instruction target address cache (BTAC), a third signal indicative of an override bit associated with said specific instruction, and a fourth signal indicative of a valid bit associated with said specific instruction; and
a direction predictor in communication with said branch instruction history table (BHT) and said branch instruction target address cache (BTAC),
said direction predictor performing the following:
receiving said first signal, said second signal, said third signal and said fourth signal;
using combinational logic to perform a comparison of said second signal and said third signal; and
depending upon results of said comparison and further depending upon said fourth signal, selecting one of said first signal and said second signal to control a determination of a final direction prediction for said specific instruction.

9. The processor of claim 8, said pre-established rules specifying override bit values of "0" for at least one of the following:
any conditional branch instructions that are encoded with hint-bits, ensuring that, for a conditional branch instruction encoded with a hint-bit, said third signal indicates that said first signal does not override said second signal; and,
any branch-decrement-not-zero type conditional branch instructions, ensuring that, for a branch-decrement-not-zero type conditional branch instruction, said third signal indicates that said first signal does not override said second signal.

10. The processor of claim 8, said final direction prediction being predicted not taken when said first signal indicates that said initial direction prediction is not taken and said second signal indicates that said specific instruction is not entered in said branch instruction target address cache (BTAC).

11. The processor of claim 8, said final direction prediction being predicted not taken when said first signal indicates that said initial direction prediction is not taken, said second signal indicates that said specific instruction is entered in said branch instruction target address cache (BTAC), and said third signal indicates that said first signal overrides said second signal.

12. The processor of claim 8, said final direction prediction being predicted taken whenever said first signal indicates said initial direction prediction is predicted taken.

13. The processor of claim 8, said final direction prediction being predicted taken when said first signal indicates that said initial direction prediction is predicted not taken, said second signal indicates that said specific instruction is entered in said branch instruction target address cache (BTAC), said fourth signal indicates that a predicted target address associated with said specific instruction is valid, and said third signal indicates that said first signal does not override said second signal.

14. The processor of claim 8, further comprising an instruction decoder receiving said specific instruction from said instruction cache and decoding said specific instruction, said final direction prediction being determined by said direction predictor prior to said instruction decoder decoding said specific instruction.

15. A data processing method, said method comprising:
during a same clock cycle, receiving, by an instruction cache, a branch instruction history table (BHT) and a branch instruction target address cache (BTAC) from an address register, a specific address for a specific instruction in said instruction cache such that reading of said branch instruction history table (BHT), said branch instruction target address cache (BTAC) and said instruction cache occurs in parallel during said same clock cycle,
said branch instruction history table (BHT) storing initial direction predictions for conditional branch instructions stored in said instruction cache, each direction prediction being one of taken and not taken,
said branch instruction target address cache (BTAC) storing target addresses and override bits for any conditional branch instructions previously predicted as taken, and
said branch instruction history table (BHT) and said branch instruction target address cache (BTAC) each being indexed by instruction cache addresses;
outputting, by said branch instruction history table (BHT) in response to said specific address, a first signal indicative of an initial direction prediction stored in said branch instruction history table (BHT) for said specific instruction;
outputting, by said branch instruction target address cache (BTAC) in response to said specific address, a second signal indicative of whether said specific instruction is entered in said branch instruction target address cache (BTAC) and a third signal indicative of an override bit associated with said specific instruction;
receiving, by a direction predictor in communication with said branch instruction history table (BHT) and said branch instruction target address cache (BTAC), said first signal, said second signal and said third signal;

performing, by said direction predictor using combinational logic, a comparison of said second signal and said third signal; and, depending upon results of said comparison, selecting, by said direction predictor, one of said first signal and said second signal to control a determination of a final direction prediction for said specific instruction.

16. The method of claim 15, said override bits being assigned according to a pre-established rule set forth in operation code, said pre-established rule specifying override bit values of "1" for all conditional branch instructions, ensuring that, for any conditional branch instruction, said third signal indicates that said first signal overrides said second signal.

17. The method of claim 15, said final direction prediction being predicted not taken when said first signal indicates that said initial direction prediction is not taken and said second signal indicates that said specific instruction is not entered in said branch instruction target address cache (BTAC).

18. The method of claim 15, said final direction prediction being predicted not taken when said first signal indicates that said initial direction prediction is not taken, said second signal indicates that said specific instruction is entered in said branch instruction target address cache (BTAC), and said third signal indicates that said first signal overrides said second signal.

19. The method of claim 15, said final direction prediction being predicted taken whenever said first signal indicates said initial direction prediction is predicted taken.

20. The method of claim 15, said final direction prediction being predicted taken when said first signal indicates that said initial direction prediction is predicted not taken, said second signal indicates that said specific instruction is entered in said branch instruction target address cache (BTAC) and said third signal indicates that said first signal does not override said second signal.

21. The method of claim 15, further comprising:
receiving, by an instruction decoder, said specific instruction from said instruction cache; and
decoding, by said instruction decoder, said specific instruction,
said final direction prediction being determined prior to said decoding of said specific instruction.

22. A data processing method, said method comprising:
during a same clock cycle, receiving, by an instruction cache, a branch instruction history table (BHT) and a branch instruction target address cache (BTAC) from an address register, a specific address for a specific instruction in said instruction cache such that reading of said branch instruction history table (BHT), said branch instruction target address cache (BTAC) and said instruction cache occurs in parallel during said same clock cycle,
said branch instruction history table (BHT) storing initial direction predictions for conditional branch instructions stored in said instruction cache, each direction prediction being one of taken and not taken,
said branch instruction target address cache (BTAC) storing target addresses, override bits and valid bits for any conditional branch instructions previously predicted as taken,
said branch instruction history table (BHT) and said branch instruction target address cache (BTAC) each being indexed by instruction cache addresses, and
said override bits being assigned to each conditional branch instruction in said branch instruction target address cache (BTAC) according to pre-established rules set forth in operation code, said pre-established rules indicating different bit values based on branch instruction type of said conditional branch instructions;

outputting, by said branch instruction history table (BHT) in response to said specific address, a first signal indicative of an initial direction prediction stored in said branch instruction history table (BHT) for said specific instruction;

outputting, by said branch instruction target address cache (BTAC) in response to said specific address, a second signal indicative of whether said specific instruction is entered in said branch instruction target address cache (BTAC), a third signal indicative of an override bit associated with said specific instruction and a fourth signal indicative of a valid bit associated with said specific instruction;

receiving, by a direction predictor in communication with said branch instruction history table (BHT) and said branch instruction target address cache (BTAC), said first signal, said second signal and said third signal;

performing, by said direction predictor using combinational logic, a comparison of said second signal and said third signal; and, depending upon results of said comparison and on said fourth signal, selecting, by said direction predictor, one of said first signal and said second signal to control a determination of a final direction prediction for said specific instruction.

23. The method of claim 22, said pre-established rules specifying override bit values of "0" for at least one of the following:
any conditional branch instructions that are encoded with hint-bits, ensuring that, for a conditional branch instruction encoded with a hint-bit, said third signal indicates that said first signal does not override said second signal; and,
any branch-decrement-not-zero type conditional branch instructions, ensuring that, for a branch-decrement-not-zero type conditional branch instruction, said third signal indicates that said first signal does not override said second signal.

24. The method of claim 22, said final direction prediction being predicted not taken when said first signal indicates that said initial direction prediction is not taken and said second signal indicates that said specific instruction is not entered in said branch instruction target address cache (BTAC).

25. The method of claim 22,
said final direction prediction being predicted not taken when said first signal indicates that said initial direction prediction is not taken, said second signal indicates that said specific instruction is entered in said branch instruction target address cache (BTAC), and said third signal indicates that said first signal overrides said second signal, and
said final direction prediction being predicted taken when said first signal indicates that said initial direction prediction is predicted not taken, said second signal indicates that said specific instruction is entered in said branch instruction target address cache (BTAC), said fourth signal indicates that a predicted target address associated with said specific instruction is valid, and said third signal indicates that said first signal does not override said second signal.

* * * * *